(12) United States Patent
Reisswig et al.

(10) Patent No.: US 11,244,208 B2
(45) Date of Patent: Feb. 8, 2022

(54) TWO-DIMENSIONAL DOCUMENT PROCESSING

(71) Applicant: SAP SE, Walldorf (DE)

(72) Inventors: Christian Reisswig, Berlin (DE); Anoop Raveendra Katti, Berlin (DE); Steffen Bickel, Berlin (DE); Johannes Hoehne, Berlin (DE); Jean Baptiste Faddoul, Berlin (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 16/711,978

(22) Filed: Dec. 12, 2019

(65) Prior Publication Data

US 2020/0117961 A1     Apr. 16, 2020

Related U.S. Application Data

(63) Continuation of application No. 15/983,489, filed on May 18, 2018, now Pat. No. 10,540,579.

(51) Int. Cl.
| | |
|---|---|
| *G06K 9/72* | (2006.01) |
| *G06K 9/00* | (2006.01) |
| *G06N 3/04* | (2006.01) |
| *G06N 3/08* | (2006.01) |

(52) U.S. Cl.
CPC ......... *G06K 9/726* (2013.01); *G06K 9/00456* (2013.01); *G06K 9/00463* (2013.01); *G06N 3/04* (2013.01); *G06N 3/08* (2013.01); *G06K 2209/01* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 10,540,579 B2 * | 1/2020 | Reisswig | G06K 9/726 |
| 2003/0095135 A1 | 5/2003 | Kaasila et al. | |
| 2009/0144605 A1 * | 6/2009 | Radakovic | G06K 9/00469 |
| | | | 715/200 |
| 2017/0323425 A1 | 11/2017 | Masuko et al. | |

(Continued)

OTHER PUBLICATIONS

Bartz, C. et al., "STN-OCR: A single Neural Network for Text Detection and Text Recognition," arxiv.org, Cornell University Library, 9 pages, Jul. 27, 2017.

(Continued)

*Primary Examiner* — Bernard Krasnic
(74) *Attorney, Agent, or Firm* — Sterne, Kessler, Goldstein & Fox P.L.L.C.

(57) ABSTRACT

Disclosed herein are system, method, and computer program product embodiments for processing a document. In an embodiment, a document processing system may receive a document. The document processing system may perform optical character recognition to obtain character information and positioning information for the characters. The document processing system may generate a down-sampled two-dimensional character grid for the document. The document processing system may apply a convolutional neural network to the character grid to obtain semantic meaning for the document. The convolutional neural network may produce a segmentation mask and bounding boxes to correspond to the document.

20 Claims, 7 Drawing Sheets

(56) References Cited

U.S. PATENT DOCUMENTS

2017/0351913 A1* 12/2017 Chen .................. G06K 9/00442

OTHER PUBLICATIONS

Extended European Search Report, dated Jun. 24, 2019, for EP Patent Appl. No. 18204940.3, 10 pages.
Jaderberg, M. et al., "Reading Text in the Wild with Convolutional Neural Networks," International Journal of Computer Vision, vol. 116, No. 1, pp. 1-20, May 7, 2015.
Palm, R. B. et al., "CloudScan—A configuration-free invoice analysis system using recurrent neural networks," 2017 14th IAPR International Conference on Document Analysis and Recognition, IEEE, vol. 1, pp. 406-413, Nov. 9, 2017.
Stewart, S. et al., "Document Image Page Segmentation and Character Recognition as Semantic Segmentation," Historical Document Imaging and Processing, ACM, pp. 101-106, Nov. 10, 2017.
Yang, X. et al., "Learning to Extract Semantic Structure from Documents Using Multimodal Fully Convolutional Neural Networks," arxiv.org, Cornell University Library, 16 pages, Jun. 7, 2017.

* cited by examiner

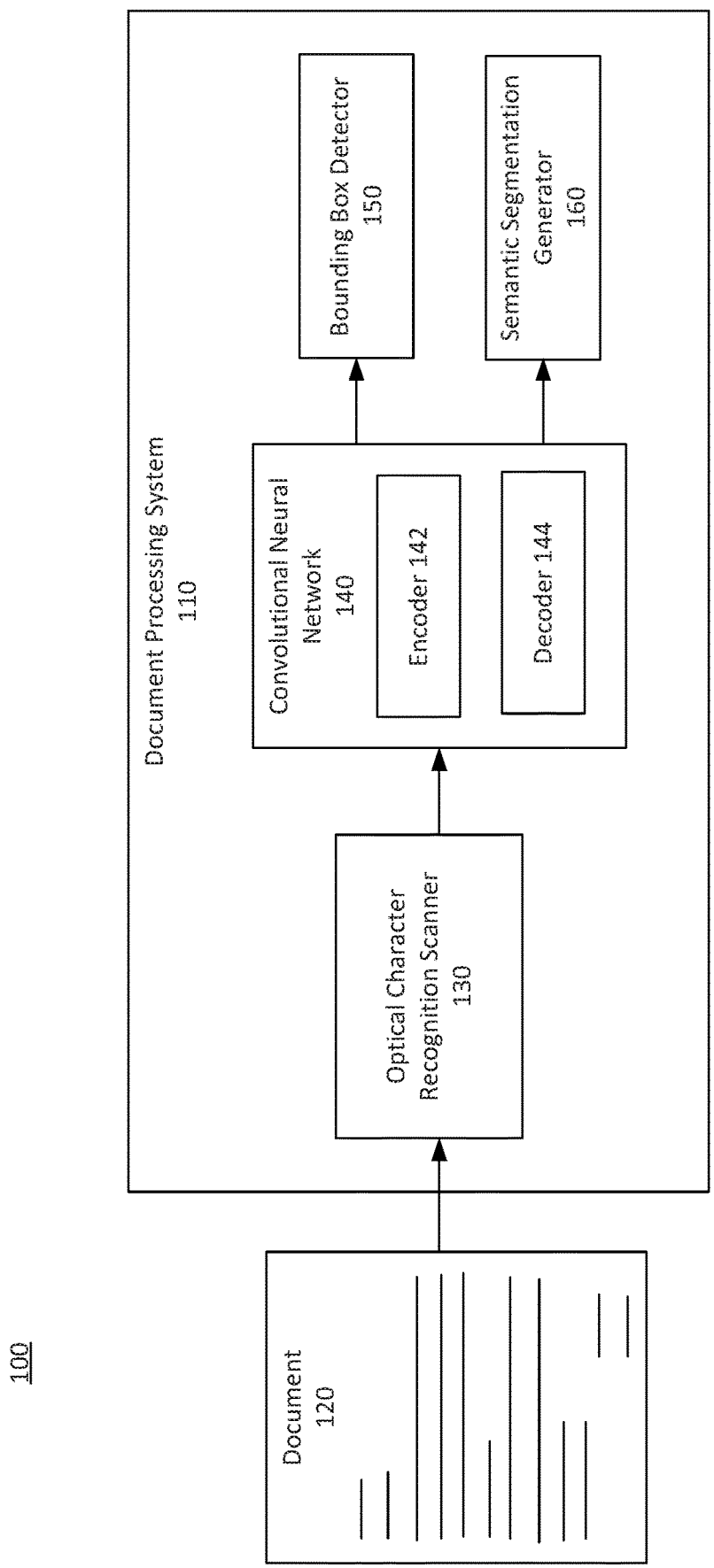

200A

THE MERCHANT COMPANY
12345 South North Street, Washington, DC 20005
Telephone: 555-555-5555
https://www.merchantcompany.com/

| | |
|---|---|
| INVOICE | 34289 |
| DATE | 28-Aug-2013 |
| DUE DATE | 10-Sep-2013 |
| ACCOUNT | 66711 |

To: Buyer Ltd.
6789 East Street
Washington, DC 20005

| SKU | SIZE | Description | QTY | PRICE | AMOUNT |
|---|---|---|---|---|---|
| 33215 | 750 | 2010 Beaune Pere et Fils | 4 | 42.75 | 171.00 |
| 34834 | 750 | 2009 Inman Pinot Noir Thorn Ridge | 4 | 47.25 | 189.00 |
| 35621 | 750 | 2008 Fontalloro FELSINA | 4 | 49.50 | 198.00 |
| 32715 | 750 | 2007 Barbaresco Riserva Ovello | 4 | 58.50 | 234.00 |
| 13988 | Each | Delivery Charge | 1 | 17.50 | 17.50 |

Number of Items: 17

Received By:

| | |
|---|---|
| Sale | 809.50 |
| Sales Tax | 65.34 |
| Total | 874.84 |

THE MERCHANT COMPANY

12345 South North Street, Washington, DC 20005

Telephone: 555-555-5555 https://www.merchantcompany.com/

| | |
|---|---|
| INVOICE | 34289 |
| DATE | 28-Aug-2013 |
| DUE DATE | 10-Sep-2013 |
| ACCOUNT | 66711 |

To: Buyer Ltd.
6789 East Street
Washington, DC 20005

| SKU | SIZE | Description | QTY | PRICE | AMOUNT | |
|---|---|---|---|---|---|---|
| 33215 | 750 | 2010 Beaune Pere et Fils | 4 | 42.75 | 171.00 | 255A |
| 34834 | 750 | 2009 Inman Pinot Noir Thorn Ridge | 4 | 47.25 | 189.00 | 255B |
| 35621 | 750 | 2008 Fontalloro FELSINA | 4 | 49.50 | 198.00 | 255C |
| 32715 | 750 | 2007 Barbaresco Riserva Ovello | 4 | 58.50 | 234.00 | 255D |
| 13988 | Each | Delivery Charge | 1 | 17.50 | 17.50 | 255E |

Number of Items: 17

| | |
|---|---|
| Sale | 809.50 |
| Sales Tax | 65.34 |
| Total | 874.84 |

Received By:

FIG. 2C

TWO-DIMENSIONAL DOCUMENT PROCESSING

CROSS-REFERENCE TO RELATED APPLICATIONS

This application is a continuation of U.S. patent application Ser. No. 15/983,489, filed May 18, 2018, the entirety of which is incorporated herein by reference.

BACKGROUND

Many documents are structured using a two-dimensional (2D) layout. Some example documents may be invoices, resumes, presentations, reports, and blogs. These documents may include tables, lists, or other visual elements. Current document recognition methods typically operate on serialized text, which may be a one-dimensional (1D) sequence of characters and words. While these methods have been successful documents having unformatted text (e.g., books, short text snippets), these methods have failed to capture the spatial and visual structure of the raw document. This failure to capture the spatial and visual structure has also become more apparent with the advent of new types of media and communication (e.g., websites, blogs, tables, presentations, and other formatted documents). The layout, positioning, and/or sizing of the content of a document may be crucial to understanding its semantic content. While human perception may be driven by the layout of a structured document, computer algorithms that rely on serialized text fail to adequately process structured documents when the relationship between words is impacted not only be the sequential order of the words but also by the document layout.

BRIEF DESCRIPTION OF THE DRAWINGS

The accompanying drawings are incorporated herein and form a part of the specification.

FIG. 1 depicts a block diagram of an example document processing environment, according to some embodiments.

FIG. 2A depicts a block diagram of an example document, according to some embodiments.

FIG. 2C depicts a block diagram of an example bounding box mask, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for two-dimensional document processing. In an embodiment, the embodiments disclosed herein may process and/or extract semantic information from structured documents.

In an embodiment, a document processing system may utilize text-based techniques as well as vision-based techniques to process a document. The document processing system may extract key-values, relationships, spatial information, and/or other information related to the 2D structure of a document. Utilizing the text-based and/or vision-based techniques, the document processing system may more quickly process a document relative to using only a vision-based approach. In an embodiment, instead of serializing into 1D text, embodiments may utilize a character grid to preserve the spatial structure of the document by representing the document as a sparse 2D grid of characters. The character grid paradigm may be applied to various tasks such as information extraction from documents such as, for example, invoices. The document processing system disclosed herein may yield a more accurate extraction of key-values and characters from tables. Key-values may be values identified as relevant with respect to the document or the purpose of the document. For example, if the document is an invoice, a key-value may be a total sales price of a line item description. While embodiments are described herein as operating on documents, this disclosure is not so limited. Instead, this disclosure is generally applicable to operation on any multi-dimensional data object.

In an embodiment, the document processing system may represent the text of a document using pixels. The document processing system may represent characters or words using index values. A "character" may refer to letters, numbers, symbols, words, a collection or combination of letters, numbers, and/or symbols, symbolic mark, an image, and/or other visual indicator on a document. In an embodiment, the document processing system may convert an identified character to an index value. The index value may correspond, for example, to a ASCII value or a dictionary of words. The conversion may use a mapping function to assign the index value. Document processing system may mask the character using the index value. In an embodiment, because a character may occupy a size measured by [width of pixels X height of pixels], masking the character may include representing the area with the index value while reducing the number of pixels used to represent the character. Document processing system may apply this process to each character of the document to generate a character grid.

Figure 4:
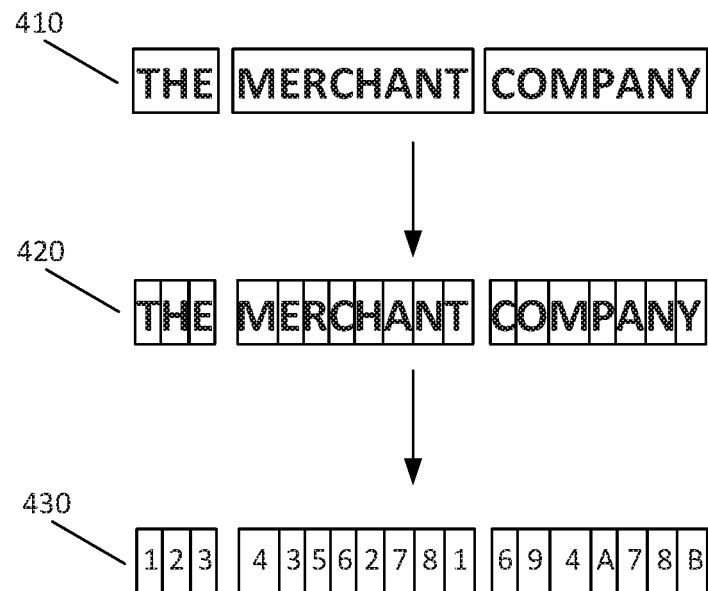
FIG. 4 depicts a block diagram of an example character processing flow, according to some embodiments.

A character grid may be an image that represents a down-sampled version of the original document. The character grid may be two-dimensional. FIG. 4, which is also further described below, depicts an example embodiment of this pixel processing. In an embodiment, the down-sampling may be by a factor of [width of pixels X height of pixels]. This may occur when [width of pixels X height of pixels] is the smallest character in the document. This down-sampling may occur by a factor equal to the pixel area covering a character of the document. In an embodiment, the character grid may represent down-sampling without the loss of information on the character level because each character is represented by an index value. In an embodiment, each cell of the character grid may be down-sampled using nearest neighbor interpolation. Down-sampling may yield the advantage that the resulting character grid is simpler and smaller in size relative to the original document image. When processing the document, a machine learning algorithm or other artificial intelligence may analyze the character grid more quickly and with fewer processing steps relative to the original document. The machine learning algorithms may also more easily determine patterns from the document.

The document processing system may also preserve the spatial relationship between the characters. In an embodiment, characters that occupy more space (e.g., if the character has larger font size) may also occupy more space (e.g., grid cells) in the character grid. In this manner, the character grid may reflect the font size formatting of the document. Further detail regarding embodiments of the generation of the character grid will be discussed below and throughout this disclosure.

After generating the character grid, the document processing system may utilize the character grid as an input to a machine learning model, such as, for example, a convolutional neural network (CNN). The CNN may process the document to extract relevant information, such as, for example, key-values or table information. Because the document has been converted from an image to a character grid, the CNN need not newly learn the characters. In this manner, the document processing system may extract key-values in a faster manner and with increased accuracy compared to a raw pixel approach or a sequence tagging approach.

Various embodiments of these features will now be discussed with respect to the corresponding figures.

FIG. 1 depicts a block diagram depicting a document processing environment 100, according to some embodiments. Document processing environment 100 includes document processing system 110. Document processing system 110 may be implemented using one or more processors and/or may include hardware and/or software and may be configured to process documents. Document processing system 110 may include optical character recognition (OCR) scanner 130, convolutional neural network (CNN) 140, bounding box detector 150, and/or semantic segmentation generator 160. Document processing system 110 may receive a document 120 for processing. Document 120 may be an image, PDF, word processing document, and/or other visual representation or manifestation of data. Examples of document 120 may include an invoice, an instruction manual, and/or a slideshow presentation.

In an embodiment, document processing system 110 may be a standalone system configured to receive document 120 and determine semantic information and/or data from document 120. Document processing system 110 may store this semantic data in a memory device and/or a database. In an embodiment, document processing system 110 may communicate with a separate system. Document processing system 110 may transmit the semantic data to the separate system. In an embodiment, document processing system 110 may be integrated with another system. For example, document processing system 110 may serve as a component of a larger system. In this embodiment, document processing system 110 may receive the document 120 from a location directed by the larger system. In an embodiment, the larger system may direct document processing system 110 to direct identified semantic information to a particular location.

Document processing system 110 may be configured to identify relevant information from the received document 120. Depending on the application and/or parameters established by CNN 140, document processing system 110 may be configured to extract key-values or desired information from document 120, classify the document, and/or classify portions of the document. For example, document processing system 110 may recognize an entity name, extract key-values, extract a table, classify the document, identify document duplication, and/or retrieve information.

For example, FIG. 2A depicts a block diagram depicting a document 200A, according to some embodiments. Document 200A may be analogous to document 120. In an embodiment, the document 200A may be an invoice and may be analyzed by document processing system 110. Document processing system 110 may retrieve the document as a file or as a depicted image. In an embodiment, a separate system that controls document processing system 110 may choose to apply document processing system 110 to the document 120. Based on parameters set within document processing system 110 and/or based on new parameters established by the separate system, document processing system 110 may identify desired portions of document 200A. For example, document processing system 110 may determine that the document 200A is an invoice based on the content and semantic relationships. Document processing system 110 may further extract invoice information such as product descriptions, the quantity of a purchase, the price of a purchase, or the amount of a purchase. Similarly, document processing system 110 may identify summary sale information and/or named entity information. In this manner, document processing system 110 may semantically analyze document 200A even if document 200A includes a 2D format. Document processing system 110 is able to preserve the semantic elements of the document to apply machine learning algorithms to process document 200A.

Returning to FIG. 1, to process document 120, document processing system 110 may apply OCR scanner 130. OCR scanner 130 may be a module executed by one or more processors of document processing system 110. OCR scanner 130 may analyze the document to extract, for example, a 1D sequence of characters from document 120. In an embodiment, OCR scanner 130 may extract string information and/or position information related to the characters of document 120. In an embodiment, document 120 may include 2D layout information and/or metadata. OCR scanner 130 may identify this metadata when scanning document 120.

In an embodiment, OCR scanner 130 may determine word bounding boxes in document 120. A word bounding box may represent a pixel area (e.g., width×height) occupied by the word. For example, referring to FIG. 4, OCR scanner 130 may identify string 410 in document 120. OCR scanner 130 may identify three separate words in this string as "THE", "MERCHANT", and "COMPANY". In an embodiment, OCR scanner 130 may recognize these words and associate each word with a word bounding box. OCR scanner 130 may also identify the location of the word bounding boxes in document 120. For example, OCR scanner 130 may utilize a coordinate system or a relative pixel location.

In an embodiment, OCR scanner 130 may divide word boxes into character boxes and convert string 410 intro string 420. For example, OCR scanner 130 may identify the pixels within a word bounding box include distinct characters. In this manner, OCR scanner 130 may convert the word box into character boxes. This division may maintain positioning information related to the characters.

In an embodiment, OCR scanner 130 may directly identify character boxes. For example, OCR scanner 130 may extract characters and pixel dimensions from document 120 without first identifying word boxes. In an embodiment, OCR scanner 130 may utilize metadata associated with document 120 to identify the character boxes and/or the word boxes. Based on the analysis performed by OCR scanner 130, document processing system 110 may recognize particular characters of document 120, the area occupied by the characters, and/or the location of the characters.

Using the information derived by OCR scanner 130, document processing system 110 may generate a character grid. OCR scanner 130 and/or one or more processors of document processing system 110 may generate the character grid. The character grid may represent a down-sampled version of document 120. The character grid may comprise grid cells corresponding to the characters of document 120. As previously explained, the character grid representation of document 120 may allow a machine learning algorithm or neural network to more quickly analyze document 120.

To generate the character grid, document processing system 110 may replace characters of document 120 with an index value. The index value may be assigned according to a mapping function. In an embodiment, an index value may be assigned via down-sampling using nearest neighbor interpolation. In an embodiment, document processing system 110 may utilize a dictionary to map a character to an index value. In an embodiment, the index value may be a vector. Document processing system 110 may generate the vector using model techniques such as, for example, Word2vec. Generating index values for the characters allows document processing system 110 to compile the character grid having index values for the characters contained within.

FIG. 4 depicts an example embodiment demonstrating the conversion of string 420 with character bounding boxes into string 430 having an index value corresponding to the characters. In an embodiment, the index values may replace the pixel area occupied by the characters. Using the index value representation, the character grid may utilize significantly less space compared to the pixels of document 120. Using this conversion, document processing system 110 is able to down-sample document 120 into a character grid having multiple index values. These index values may be lossless and may yield a character grid that has not lost character information while being smaller in size than document 120. While maintaining this lossless conversion, document processing system 110 is able to generate a 2D character grid that may be more easily processed by a machine learning algorithm.

In an embodiment, document processing system 110 may assign index values for each character of document 120. The collective index values along with the positioning information for the index values may comprise the character grid. In an embodiment, the character grid may be 1-hot encoded to yield an N-channel input image, where N corresponds to the number of indexed characters including a possible "background" class. The background class may, for example, refer to the background or "white space" of document 120. In an embodiment, to decrease the number of channels for computational reasons, document processing system 110 may apply index hashing.

While FIG. 4 depicts a rectangular representation for a character, in an embodiment, document processing system 110 may additionally or alternatively utilize other forms for representation. For example, document processing system 110 may represent a character using a continuous distribution in a 1-hot encoded space rather than a 2D rectangular window function. In this case, the pixel area occupied by the character in the channel corresponding to the character could smoothly fall off from a value of "one" at the center location of the character to "zero" towards the edge of the area that the character occupies. For example, this representation may appear similar to a Gaussian distribution. The distribution may be truncated at the character boundary.

In an embodiment, the Gaussian distribution may cover neighboring grid cells. In this case, characters may overlap with neighboring characters. If this occurs, the conversion may change from a 1-hot encoding to a multiple-hot encoding. By using this non-rectangular representation model, document processing system 110 may potentially learn better local dependencies when applying the machine learning algorithms.

In an embodiment, the character grid may be further down-sampled in the 1-hot encoded space. Characters that previously occupied one grid cell may now be represented on the sub-cell level by a value that is less than "one." This representation may result from a bilinear interpolation of the grid cells.

After generating the character grid representation of document 120, document processing system 110 may apply input the character grid to convolutional neural network (CNN) 140. CNN 140 may include an encoder 142 and/or a decoder 144. CNN 140 may be an artificial intelligence network and/or may apply machine learning algorithms to identify desired characters and/or aspects of document 120. For example, encoder 142 may aid in determining semantic meaning. Encoder 142 may aid, for example, in extracting key-values or table information. Because the character grid utilizes index values, CNN 140 is able to quickly process the character grid relative to processing document 120. For example, CNN 140 may more quickly employ computer vision techniques or natural language processing techniques because document 120 has already been converted into a simpler form.

In an embodiment, CNN 140 may extract desired or relevant information from the character grid depending on the application of the resulting information. For example, if document 120 is an invoice and document processing system 110 has been configured to classify different semantic classes of information within document 120, CNN 140 may be trained to identify the different semantic classes. For example, a class may be the named entity receiving the invoice. CNN 140 may be trained to identify the named entity when analyzing the character grid and/or other subsequent character grids. By associating characters from document 120 with a corresponding class (e.g., named entity), document processing system 110 may provide semantic meaning to document 120. When analyzing an invoice, for example, document processing system 110 may further extract invoice information such as product descriptions, the quantity of a purchase, the price of a purchase, or the amount of a purchase. Similarly, document processing system 110 may identify summary sale information and/or named entity information.

FIG. 2A provides an example embodiment of document 200A. Document 200A may be analogous to document 120. In an embodiment, document 200A may include information such as, a name 210, an address 220, a document identifier 230, a header 240, line items 250, a first summary 260, and a second summary 270. These items may represent classes. An administrator of document processing system 110 may have defined this classes as the classes of interest. In this manner, training CNN 140 may allow for improved accuracy in determining values corresponding to these classes when document processing system 110 analyzes a document 120.

For example, document processing system 110 may be utilized to (1) determine whether a document 120 is an invoice, (2) identify the invoice number, and (3) identify the total cost of the invoice. In this embodiment, document processing system 110 may utilize document identifier 230 as a category to determine the invoice number and use second summary 270 as the total cost of the invoice. To determine whether the document 120 is an invoice, document processing system 110 may analyze the particular arrangement of classes 210-270. For example, identifying the presence of line items 250 in the middle portion of document 200A may indicate a greater likelihood that document 120 is an invoice. CNN 140 may be trained to identify these patterns to process document 120 to suit the desired application. In an embodiment, because CNN 140 receives the character grid representation of document 120, CNN 140 may be trained to analyze character grids.

After receiving a character grid, CNN 140 may utilize encoder 142 to determine semantic meanings associated with relevant identified classes. Encoder 142 may utilize neural network techniques and/or convolution techniques to identify the desired information related document 120. In an embodiment, CNN 140 may utilize two neural networks. The first neural network may classify each character using semantic segmentation. The first neural network may be useful for classes or field types that appear as a single instance on a document 120 (e.g., the document date). The second neural network may be used to distinguish multiple instances of the same class or field type. The second neural network may be trained to detect different instances by applying bounding box regression. For example, the second neural network may be trained to detect multiple rows of a table. Both neural networks may share encoder 142 and/or parts of decoder 144. The neural networks may branch near the last few network layers.

By utilizing the character grid, encoder 142 is able to more quickly identify the information relative to directly examining document 120. Further, encoder 142 may utilize the location information related to the grid cells and index values to extract further semantic meaning relative to a 1D analysis. In this manner, encoder 142 may assign semantic meaning to the characters and words of document 120 and/or return records in the form of text strings.

In an embodiment, depending on the application of document processing system 110, CNN 140 may include decoder 144. After an encoding process performed on a character grid, document processing system 110 may be configured to produce a 2D representation of the determined semantic meanings. Decoder 144 may aid in producing this 2D representation. Decoder 144 may perform transposed convolution, deconvolution, or fractionally strided convolution to up-sample the results of the encoding. In this manner, decoder 144 may up-sample newly determined index values into a pixel location representation. In this manner, decoder 144 may aid in applying semantic meaning to a 2D pixel representation of document 120. Up-sampling may allow a user to view the output of document processing system 110 as a mask covering document 120. This mask may be an overlay over document 120 or may exist separately. Using the pixel representation, a user may view the semantic information via a display screen.

Figure 2B:
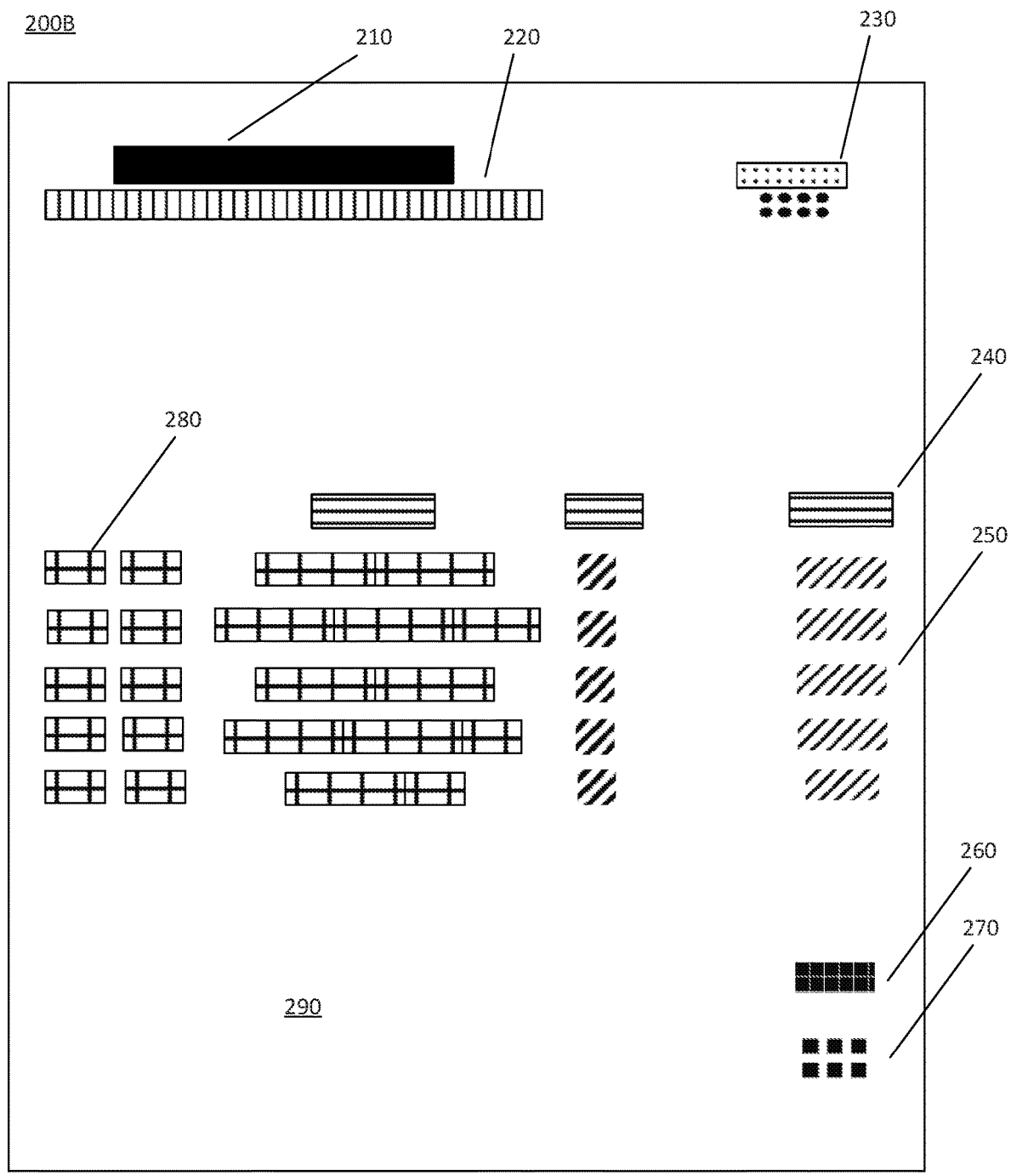
FIG. 2B depicts a block diagram of an example segmentation mask, according to some embodiments.

After a character grid is applied to CNN 140, CNN 140 may utilize bounding box detector 150 and/or semantic segmentation generator 160 to generate a 2D representation of the semantic meaning determined by CNN 140. In an embodiment, semantic segmentation generator 160 may produce a segmentation mask, displaying the class assigned to each character or word. FIG. 2B depicts an example embodiment of a segmentation mask 200B for document 200A depicted in FIG. 2A. Segmentation mask 200B may include semantic information related to document 200A. For example, segmentation mask 200B may use patterns and/or colors to characterize the portions of document 200A with their corresponding class. Segmentation mask 200B may be visible to a user of document processing system 110 and/or may be a formatted file. In an embodiment, segmentation mask 200B may utilize a different pattern for each class of a name 210, an address 220, a document identifier 230, a header 240, line items 250, a first summary 260, and a second summary 270.

Segmentation mask 200B may further identify multiple instances of a class, such as for line items 250. Regarding line items 250, segmentation mask 200B may generate a sub class, such as, for example a description 280. The pattern corresponding to description 280 may be applied to the characters and/or words falling into this description 280 class.

In an embodiment, segmentation mask 200B may identify a background 290. Background 290 may aid in the distinction between different classes 210-280. Background 290 may identify "white space" in a document 200A. Segmentation mask 200B allows for characterizing of relevant classes while also minimizing non-relevant classes. For example, document 200A may include a signature block. If a signature block is not relevant based on the parameters set by CNN 140, segmentation mask 200B may display the signature block as background 290. Combining the relevant class information into a segmentation mask 200B allows document processing system 110 to produce a 2D object that displays relevant semantic information.

In addition to producing segmentation mask 200B, document processing system 110 may generate a bounding box mask 200C. An embodiment of bounding box mask 200C is depicted in FIG. 2C. To generate bounding box mask 200C, document processing system 110 may utilize bounding box detector 150. Bounding box detector 150 may aid in identifying different instances of a class. Bounding box detector 150 may produce a bounding box mask 200C to aid in this process. For example, bounding box mask 200C includes bounding boxes 255A-255E. In an embodiment, these bounding boxes 255A-255E may identify different instances of the line item class 250. Based on the application, distinguishing between the instances of line item class 250 may aid in more accurately analyzing the content of the document 120. For example, bounding box detector 150 may identify five line items 250 listed on document 200A. In an embodiment, bounding box mask 200C may be stored and/or used with segmentation mask 200B to provide a semantic representation of document 120.

In an embodiment, a word box obtained via OCR scanner 130 may appear on a boundary of a bounding box 255. That is, a word box obtained via OCR scanner 130 may overlap into two bounding boxes 255. In this scenario, document processing system 110 may compute the overlap of word boxes and identify potential candidate words. Document processing system 110 may assign words to the bounding boxes 255 based on the most overlap. For each bounding box 255, bounding box detector 150 may classify the words according to the overlap using segmentation mask 200B. Document processing system 110 may then concatenate the words of a class.

In an embodiment, document processing system 110 may process multiple predictions for a field. For example, document processing system 110 may sense an overlap in a "Price" field and an "Amount" field within a bounding box 225. In this case, for each word, document processing system 110 may compute a weighted mean confidence value. This calculation may be the word area divided by the class area multiplied by the mean confidence value. Document processing system 110 may select an anchor word using the word with the largest weighted mean confidence. Document processing system 110 may then collect the neighboring words based on a confidence threshold to determine the correct classification.

Via the use of the character grid, document processing system 110 may generate both segmentation mask 200B and bounding box mask 200C quickly relative to applying conventional computer vision techniques to a document. In an embodiment, document processing system 110 may store segmentation mask 200B and/or bounding box mask 200C, along with document 120 and/or an OCR version of document 120. Document processing system 110 may make this information available to other systems to perform further analysis related to the document. In an embodiment, document processing system 110 may utilize this information in a software application and/or may display segmentation mask 200B and/or bounding box mask 200C on a display screen for user manipulation. Utilizing document processing system 110, computer systems may easily recognize the content of a document 120 as well as extract semantic meaning from the document 120.

Figure 3:
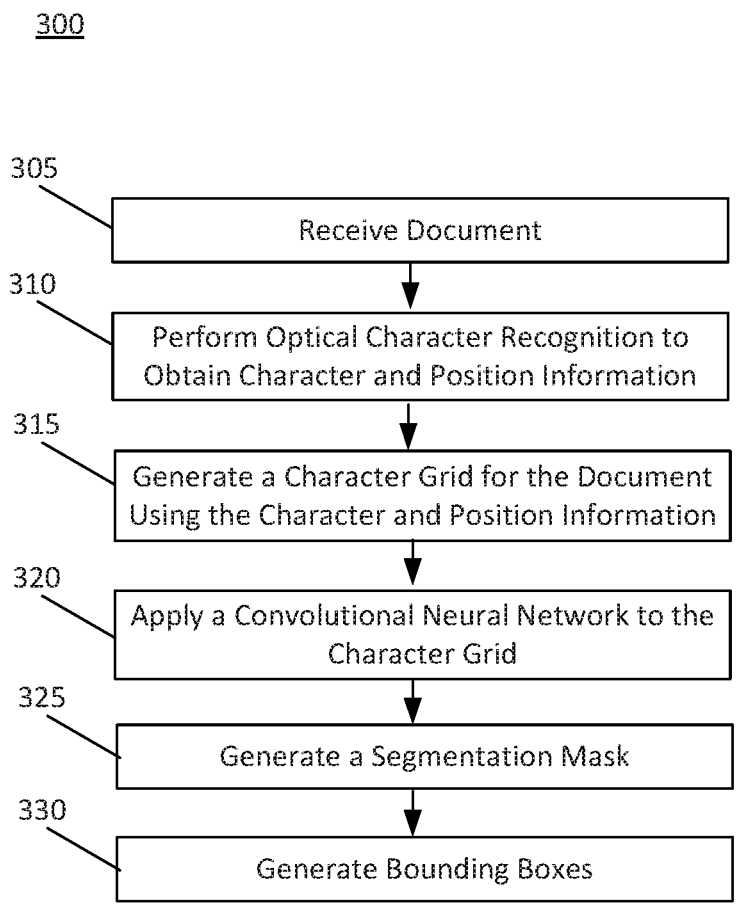
FIG. 3 depicts a flowchart illustrating a method for processing a document, according to some embodiments.

FIG. 3 depicts a flowchart illustrating a method 300 for processing a document, according to some embodiments. Method 300 shall be described with reference to FIG. 1; however, method 300 is not limited to that example embodiment.

In an embodiment, document processing system 110 may utilize method 300 to process document 120. Method 300 may generate a semantic representation of document 120. The foregoing description will describe an embodiment of the execution of method 300 with respect to document processing system 110. While method 300 is described with reference to document processing system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, document processing system 110 may receive a document 120. Document 120 may be a file including text. For example, document 120 may be an image, word processing document, PDF file, screenshot, and/or a combination of text and images. In an embodiment, document 120 may be a scanned document and/or may contain multiple pages and/or slides.

In an embodiment, document processing system 110 may be a standalone system configured to receive document 120 and determine semantic information from document 120. Document processing system 110 may store this semantic information in a memory device and/or a database. In an embodiment, document processing system 110 may communicate with a separate system. Document processing system 110 may transmit the semantic information to the separate system. In an embodiment, document processing system 110 may be integrated with another system. For example, document processing system 110 may serve as a component of a larger system. In this embodiment, document processing system 110 may receive the document 120 from a location directed by the larger system. In an embodiment, the larger system may direct document processing system 110 to direct identified semantic information to a particular location.

At 310, document processing system 110 may perform optical character recognition on document 120 to obtain character and position information. The character information may relate to letters, numbers, symbols, words, a collection or combination of letters, numbers, and/or symbols, symbolic mark, an image, and/or other visual indicators on a document. Document processing system 110 may utilize OCR scanner 130 to perform the character recognition. OCR scanner 130 may identify word and/or character strings. OCR scanner 130 may identify the location of the characters within document 120. OCR scanner 130 may perform a pixel based analysis to identify the characters and position information.

At 315, document processing system 110 may generate a character grid for the document 120 using the character and position information. Generating the character grid may include replacing characters of document 120 with an index value. The index value may be assigned according to a mapping function. In an embodiment, an index value may be assigned via down-sampling using nearest neighbor interpolation. In an embodiment, document processing system 110 may utilize a dictionary to map a character to an index value. In an embodiment, the index value may be a vector. Document processing system 110 may generate the vector using model techniques such as, for example, Word2vec. Generating index values for the characters allows document processing system 110 to compile the character grid having index values for the characters contained within.

In an embodiment, generating the character grid may result in a down-sampled version of document 120. The down-sampled version may result in faster processing of document 120.

At 320, document processing system 110 may apply convolutional neural network (CNN) 140 to the character grid. In an embodiment, CNN 140 may extract desired or relevant information from the character grid depending on the application of the resulting information. For example, CNN 140 may be trained to identify classes of information within a document and/or identify the class of the document. CNN 140 may apply machine learning and convolution techniques to determine the semantic meaning. CNN 140 may produce this information as a character string and/or as a 2D representation of semantic meaning.

At 325, document processing system 110 may produce a segmentation mask, displaying the class assigned to each character or word. FIG. 2B depicts an example embodiment of a segmentation mask 200B for document 200A depicted in FIG. 2A. Segmentation mask 200B may include semantic information related to document 200A. For example, segmentation mask 200B may use patterns and/or colors to characterize the portions of document 200A with their corresponding class. The segmentation mask may be a result of a deconvolution process. This deconvolution process may include up-sampling of a determined result so that the segmentation may be displayed in a 2D pixel representation.

At 330, document processing system 110 may produce bounding boxes or a bounding box mask. An embodiment of bounding box mask 200C is depicted in FIG. 2C. Document processing system 110 may aid in identifying different instances of a class. For example, bounding box mask 200C includes bounding boxes 255A-255E. In an embodiment, these bounding boxes 255A-255E may identify different instances of the line item class 250. Based on the application, distinguishing between the instances of line item class 250 may aid in more accurately analyzing the content of the document 120. For example, bounding box detector 150 may identify five line items 250 listed on document 200A. In an embodiment, bounding box mask 200C may be stored and/or used with segmentation mask 200B to provide a semantic representation of document 120.

After the generation of a segmentation mask and bounding boxes, document processing system 110 may store the segmentation mask and/or bounding box along with document 120 and/or an OCR version of document 120. Document processing system 110 may make this information available to other systems to perform further analysis related to the document. In an embodiment, document processing system 110 may utilize this information in a software application and/or may display segmentation mask 200B and/or bounding box mask 200C on a display screen for user manipulation. In an embodiment, document processing system 110 may output segmentation mask 200B and/or bounding box mask 200C via a JSON formatted file.

Figure 5:
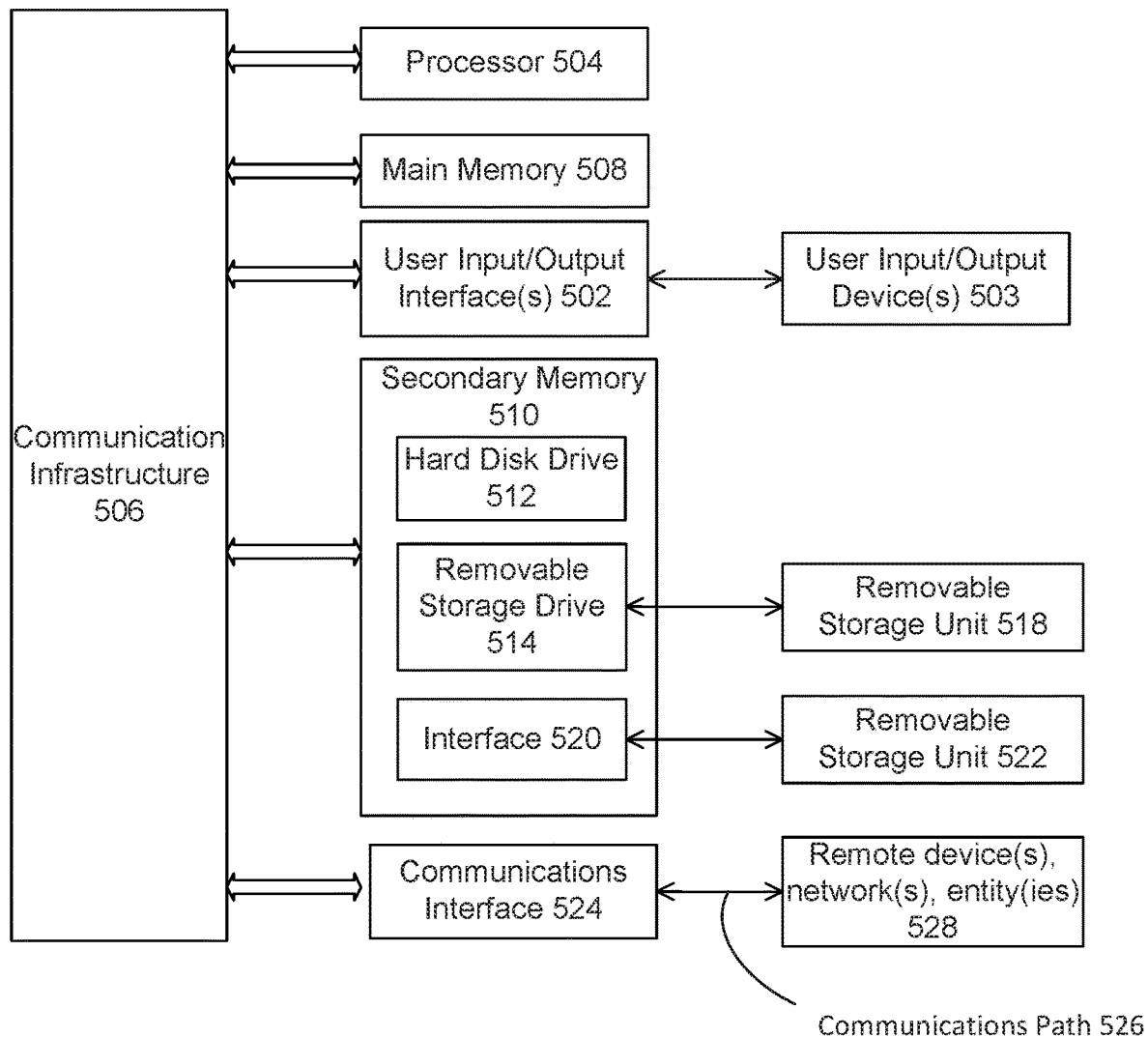
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
performing optical character recognition on a document;
generating a character grid using character information obtained from the optical character recognition, wherein the character grid maps a spatial relation between characters of the document;
applying a machine learning algorithm to the character grid;
in response to the applying, generating a segmentation mask depicting semantic data of the document and one or more bounding boxes identifying an instance of a semantic class;
identifying a word from the document, wherein the word overlaps multiple bounding boxes of the one or more bounding boxes;
computing a plurality of weighted mean confidence values at least by multiplying a mean confidence value by a ratio of word area to class area; and
determining at least one neighboring word of an anchor word having a relative maximum value of the plurality of weighted mean confidence values, wherein the at least one neighboring word is determined based at least in part on a confidence threshold with respect to at least one weighted mean confidence value of the plurality of weighted mean confidence values, and wherein the word identified and overlapping multiple bounding boxes corresponds to at least one of the anchor word, the at least one neighboring word, or a factor of the word area.

2. The computer implemented method of claim 1, wherein applying the machine learning algorithm further comprises:
applying a convolutional neural network to the character grid.

3. The computer implemented method of claim 1, wherein generating the segmentation mask further comprises:
applying a deconvolution process to up-sample a determined result from the machine learning algorithm.

4. The computer implemented method of claim 1, further comprising:
displaying the segmentation mask as an overlay on the document with colors to characterize portions of the document.

5. The computer implemented method of claim 1, wherein the one or more bounding boxes are organized into a bounding box mask overlaid on the document.

6. The computer implemented method of claim 1, further comprising:
assigning the word to a bounding box of the multiple bounding boxes having a majority of characters of the word.

7. The computer implemented method of claim 1, further comprising:
identifying a value prediction of a bounding box from the document, wherein the value prediction overlaps multiple semantic fields; and
assigning the value prediction to a semantic field of the multiple semantic fields, based at least in part on the at least one weighted mean confidence value of the plurality of weighted mean confidence values.

8. A system, comprising:
a memory; and
at least one processor coupled to the memory and configured to:
perform optical character recognition on a document;
generate a character grid using character information obtained from the optical character recognition, wherein the character grid maps a spatial relation between characters of the document;
apply a machine learning algorithm to the character grid;
in response to the applying, generate a segmentation mask depicting semantic data of the document and one or more bounding boxes identifying an instance of a semantic class;
identify a word from the document, wherein the word overlaps multiple bounding boxes of the one or more bounding boxes;

compute a plurality of weighted mean confidence values at least by multiplying a mean confidence value by a ratio of word area to class area; and determine at least one neighboring word of an anchor word having a relative maximum value of the plurality of weighted mean confidence values, wherein the at least one neighboring word is determined based at least in part on a confidence threshold with respect to at least one weighted mean confidence value of the plurality of weighted mean confidence values, and wherein the word identified and overlapping multiple bounding boxes corresponds to at least one of the anchor word, the at least one neighboring word, or a factor of the word area.

9. The system of claim 8, wherein to apply the machine learning algorithm, the at least one processor is further configured to:

apply a convolutional neural network to the character grid.

10. The system of claim 8, wherein to generate the segmentation mask, the at least one processor is further configured to:

apply a deconvolution process to up-sample a determined result from the machine learning algorithm.

11. The system of claim 8, wherein the at least one processor is further configured to:

display the segmentation mask as an overlay on the document with colors to characterize portions of the document.

12. The system of claim 8, wherein the one or more bounding boxes are organized into a bounding box mask overlaid on the document.

13. The system of claim 8, wherein the at least one processor is further configured to:

assign the word to a bounding box of the multiple bounding boxes having a majority of characters of the word.

14. The system of claim 8, wherein the at least one processor is further configured to:

identify a value prediction of a bounding box from the document, wherein the value prediction overlaps multiple semantic fields; and assign the value prediction to a semantic field of the multiple semantic fields, based at least in part on the at least one weighted mean confidence value of the plurality of weighted mean confidence values.

15. A non-transitory computer-readable device having instructions stored thereon that, when executed by at least one computing device, cause the at least one computing device to perform operations comprising:

performing optical character recognition on a document;

generating a character grid using character information obtained from the optical character recognition, wherein the character grid maps a spatial relation between characters of the document;

applying a machine learning algorithm to the character grid;

in response to the applying, generating a segmentation mask depicting semantic data of the document and one or more bounding boxes identifying an instance of a semantic class;

identify a word from the document, wherein the word overlaps multiple bounding boxes of the one or more bounding boxes;

compute a plurality of weighted mean confidence values at least by multiplying a mean confidence value by a ratio of word area to class area; and determining at least one neighboring word of an anchor word having a relative maximum value of the plurality of weighted mean confidence values, wherein the at least one neighboring word is determined based at least in part on a confidence threshold with respect to at least one weighted mean confidence value of the plurality of weighted mean confidence values, and wherein the word identified and overlapping multiple bounding boxes corresponds to at least one of the anchor word, the at least one neighboring word, or a factor of the word area.

16. The non-transitory computer-readable device of claim 15, wherein applying the machine learning algorithm further comprises:

applying a convolutional neural network to the character grid.

17. The non-transitory computer-readable device of claim 15, wherein generating the segmentation mask further comprises:

applying a deconvolution process to up-sample a determined result from the machine learning algorithm.

18. The non-transitory computer-readable device of claim 15, the operations further comprising:

displaying the segmentation mask as an overlay on the document with colors to characterize portions of the document.

19. The non-transitory computer-readable device of claim 15, the operations further comprising:

assigning the word to a bounding box of the multiple bounding boxes having a majority of characters of the word.

20. The non-transitory computer-readable device of claim 15, the operations further comprising:

identifying a value prediction of a bounding box from the document, wherein the value prediction overlaps multiple semantic fields; and assigning the value prediction to a semantic field of the multiple semantic fields, based at least in part on the at least one weighted mean confidence value of the plurality of weighted mean confidence values.

* * * * *